United States Patent [19]

Rosaen

[11] Patent Number: 4,569,233
[45] Date of Patent: Feb. 11, 1986

[54] FLOW METER INDICATING DEVICE

[75] Inventor: Lars Rosaen, Hazel Park, Mich.

[73] Assignee: Universal Flow Monitors, Hazel Park, Mich.

[21] Appl. No.: 583,621

[22] Filed: Feb. 27, 1984

[51] Int. Cl.[4] .................... G01F 1/20; G01B 7/14
[52] U.S. Cl. .................... 73/861.42; 73/861.71; 73/DIG. 3; 73/861.77; 324/207
[58] Field of Search .......... 73/861.53, 861.56, 861.71, 73/861.74, 861.75, 861.76, 861.77, DIG. 3, 861.42, 861.54; 324/207, 208

[56] References Cited

U.S. PATENT DOCUMENTS

| | | | |
|---|---|---|---|
| 1,967,017 | 7/1934 | Bohner | 177/311 |
| 1,998,110 | 4/1935 | Warren | 177/351 |
| 2,601,678 | 6/1952 | Beatty | 73/861.74 X |
| 2,987,669 | 6/1961 | Kallmann | 73/DIG. 3 |
| 3,164,018 | 1/1965 | Bennett . | |
| 3,444,731 | 5/1969 | Nieuweboer | 73/DIG. 3 |
| 3,529,591 | 9/1970 | Schuette . | |
| 3,559,197 | 1/1971 | Jarvis | 340/239 |
| 3,857,277 | 12/1974 | Moore . | |
| 3,971,253 | 7/1976 | Hini et al. . | |
| 4,022,061 | 5/1977 | Schendel | 73/861.75 |
| 4,073,189 | 2/1978 | Draper . | |
| 4,191,951 | 3/1980 | Fuzzell | 73/DIG. 3 |
| 4,344,331 | 8/1982 | Iwasaki | 73/861 |
| 4,366,179 | 1/1983 | Bohm et al. | 73/861 |
| 4,475,407 | 10/1984 | Kruncos | 73/861.53 |

Primary Examiner—Herbert Goldstein
Attorney, Agent, or Firm—Gifford, VanOphem, Sheridan & Sprinkle

[57] ABSTRACT

The present invention provides a device for generating an electrical output signal representative of the flow rate through a fluid flow meter of the type having a mechanical output member movable in an amount proportional to the fluid flow rate. The device comprises the U-shaped magnet having a north and south pole and a Hall effect transducer positioned between the poles of the magnet. The transducer produces an electrical signal representative of the distance between the transducer and one of the magnetic poles. The magnet in turn is connected to the mechanical output member from the flow meter so that the magnet moves in unison with the output member from the flow meter thus varying the transducer electrical output. The output from the transducer is electrically connected to a conventional electrical indicator to produce an indication of the fluid flow rate through the flow meter.

5 Claims, 2 Drawing Figures

FLOW METER INDICATING DEVICE

BACKGROUND OF THE INVENTION

I. Field of the Invention

The present invention relates to electrical indicating means for use with a fluid flow meter.

II. Description of the Prior Art

There are a number of previously known fluid flow meters having a rotatable output shaft which rotates in an amount proportional to the fluid flow rate through the flow meter. Typically, an indicator needle is secured to the shaft and cooperates with an indicia scale on the flow meter to provide a visual indication of the fluid flow rate.

One disadvantage of these previously known fluid flow meter indicators is that the fluid flow rate of the flow meter can not be monitored from a position remote from the flow meter. Instead, the meter must be visually inspected in order to determine the flow rate. This procedure, however, is particularly disadvantageous in situations where it is desirable to monitor a plurality of flow meters from a central control area.

There have, however, been a number of previously known fluid flow meter indicator devices which produce an electrical signal representative of the flow rate from the flow meter. These electrical outputs can then be read at a position remote from the flow meter itself. One disadvantage of these previously known devices, however, is that they are expensive in construction and prone to failure.

SUMMARY OF THE PRESENT INVENTION

The present invention provides a fluid flow meter indicator which overcomes all of the above mentioned disadvantages of the previously known devices.

In brief, the indicator device of the present invention comprises a U-shaped magnet having a north and south pole. In the preferred form of the invention, a rack is secured to the magnet and cooperates with a pinion attached to the output shaft from the flow meter. Consequently, rotation of the flow meter output shaft linearly displaces the magnet along a predetermined path of travel.

A Hall effect transducer is positioned between the magnetic poles of the magnet. The Hall effect transducer produces a voltage output representative of the distance between the transducer and one of the magnetic poles. A voltage to current converter then translates the voltage output from the transducer to a current signal proportional to the position of the magnet and thus of the fluid flow rate through the flow meter. The output from the converter is connected to a conventional electrical indicator which can be at a position remote from the flow meter.

BRIEF DESCRIPTION OF THE DRAWING

A better understanding of the present invention will be had upon reference to the following detailed description, when read in conjunction with the accompanying drawing wherein like reference characters refer to like parts throughout the several views, and in which.

DETAILED DESCRIPTION OF A PREFERRED EMBODIMENT OF THE INVENTION

Figure 1:
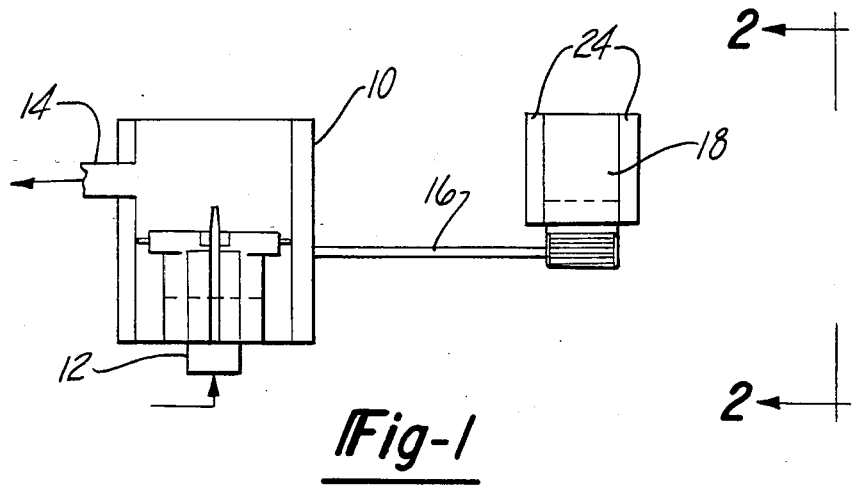
FIG. 1 is a diagrammatical view illustrating a preferred embodiment of the invention.

With reference to the drawing, a preferred embodiment of the indicating device of the present invention is thereshown for use with a conventional fluid flow meter 10. The fluid flow meter 10, which is illustrated only diagrammatically, includes a fluid inlet 12 and a fluid outlet 14. The flow meter 10 can, for example, comprise a piston-type flow meter and includes an output shaft 16 which rotates an amount proportional to the fluid flow rate from the inlet 12 and to the outlet 14.

The preferred embodiment of the indicating device of the present invention comprises a U-shaped permanent magnet 18 having a north pole 20 and a south pole 22. A track assembly 24 (illustrated only diagrammatically) allows the magnet 18 to move linearly in a direction parallel with its base 26.

A pinion 28 is secured to the flow meter output shaft 16 and meshes with a gear rack 30 secured to the magnet base 26. Consequently, the rack 30 and pinion 28 translate the rotational motion of the shaft 16 to linear motion of the magnet 18.

Figure 2:
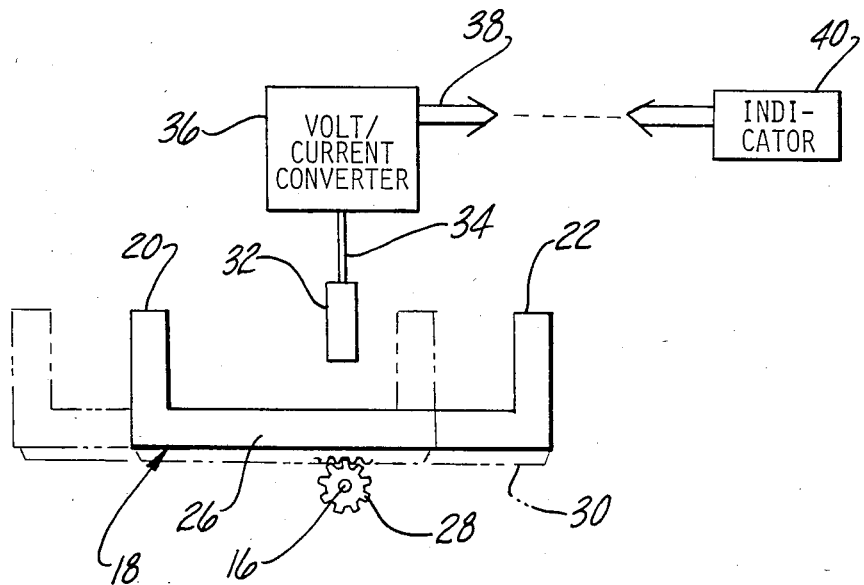
FIG. 2 is a diagrammatic view taken substantially along line 2—2 in FIG. 1.

With reference now particularly to FIG. 2, a Hall effect transducer 32 is positioned at a midpoint between the magnet poles 20 and 22. The transducer 32 generates a voltage at its output 34 having a magnitude representative of the distance between one of the magnetic poles 20 or 22 and the transducer 32. Consequently, the voltage on the transducer output 34 will vary as the magnet 18 is moved from the position shown in phantom line and to the position shown in solid line, and vice versa.

The output 34 from the transducer 32 is, in turn, connected as an input signal to a voltage-to-current converter 36. The converter 36 generates a current signal at its output 38 which is proportional to its voltage input. In the preferred form of the invention, the converter generates an output current of four milliamps when the magnet 18 is in one extreme position and increases to a current output of 20 milliamps when the permanent magnet 18 is in its other extreme position.

Still referring to FIG. 2, the current output 38 from the converter 36 is connected as in input signal to an indicator 40 which can be of any conventional design. Furthermore, the indicator 40 can be physically located at a place remote from the flow meter 10.

From the foregoing, it can be seen that the present invention provides a simple, inexpensive and yet totally effective device for converting the mechanical output from a flow meter to an electrical signal which can be monitored at a position remote from the flow meter. Consequently, the present invention enables a plurality of spaced apart flow meters to be monitored at a central control area.

Although the preferred embodiment of the invention uses a rack and pinion for translating the mechanical rotary output from the flow meter to linear movement of the magnet, it will be understood that other means may alternatively be used.

Having described my invention, however, many modifications thereto will become apparent to those skilled in the art to which it pertains without deviation from the spirit of the invention as defined by the scope of the appended claims.

I claim:

1. For use in conjunction with a fluid flow meter having a mechanical output member movable in an amount proportional to the fluid flow rate through the flow meter, a device for generating an electrical output representative of the flow rate through the flow meter comprising:
- a magnet having a north and south pole,
- a transducer positioned between said poles of said magnet, said transducer producing an electrical signal representative of the distance between the transducer and one of said poles, and
- means for moving said magnet to vary the distance between said one of said poles with respect to said transducer in a direction opposite to movement of the other of said poles with respect to said transducer in an amount proportional to the movement of said mechanical output member from the flow meter.

2. The invention as defined in claim 1 wherein said electrical signal comprises a variable voltage signal.

3. The invention as defined in claim 2 and comprising means for converting said voltage signal to a current proportional to said voltage.

4. The invention as defined in claim 1 wherein said moving means comprises means for mechanically connecting the output member to the magnet.

5. The invention as defined in claim 4 wherein the output member rotates an amount proportional to the flow rate and wherein said mechanical connecting means comprises
- a pinion secured to the output member,
- a gear rack secured to the magnet, and
- wherein said pinion meshed with said gear rack.

* * * * *